United States Patent
Moser

(10) Patent No.: US 10,247,598 B2
(45) Date of Patent: Apr. 2, 2019

(54) METHOD FOR DISPLAYING THE WEIGHING RESULT OF A SCALE

(71) Applicant: BIZERBA GMBH & CO. KG, Balingen (DE)

(72) Inventor: Jurgen Moser, Mebstetten (DE)

(73) Assignee: BIZERBA SE & CO. KG, Balingen (DE)

( * ) Notice: Subject to any disclaimer, the term of this patent is extended or adjusted under 35 U.S.C. 154(b) by 158 days.

(21) Appl. No.: 15/113,767

(22) PCT Filed: Nov. 17, 2014

(86) PCT No.: PCT/EP2014/074770
§ 371 (c)(1),
(2) Date: Jul. 22, 2016

(87) PCT Pub. No.: WO2015/110197
PCT Pub. Date: Jul. 30, 2015

(65) Prior Publication Data
US 2017/0003161 A1    Jan. 5, 2017

(30) Foreign Application Priority Data

Jan. 23, 2014   (DE) ........................ 10 2014 100 754

(51) Int. Cl.
*G01G 23/01*  (2006.01)
*G01G 23/37*  (2006.01)

(52) U.S. Cl.
CPC ....... *G01G 23/017* (2013.01); *G01G 23/3735* (2013.01); *G01G 23/3721* (2013.01)

(58) Field of Classification Search
CPC ............ G01G 23/017; G01G 23/3721; G01G 23/3728; G01G 23/3735; G01G 23/3742
See application file for complete search history.

(56) References Cited

U.S. PATENT DOCUMENTS

| | | | |
|---|---|---|---|
| 6,237,098 B1 * | 5/2001 | Libicki ................. | G01G 19/02 380/277 |
| 6,810,355 B1 * | 10/2004 | Kreidler ............ | G01G 19/4144 177/25.13 |
| 7,640,130 B2 | 12/2009 | Churan et al. | |
| 9,062,999 B2 * | 6/2015 | Brouhard ............... | G01G 23/44 |

(Continued)

FOREIGN PATENT DOCUMENTS

| DE | 202005015304 A1 | 4/2006 |
|---|---|---|
| DE | 102008019311 A1 | 1/2009 |

(Continued)

OTHER PUBLICATIONS

Machine translation of DE 10 2009 007 733 A1.*
German Search Report, dated Sep. 1, 2014; received by the German Patent Office in Application No. 102014100754.9, 2 pages.

*Primary Examiner* — Natalie Huls
(74) *Attorney, Agent, or Firm* — Kilpatrick Townsend & Stockton LLP

(57) ABSTRACT

The invention relates to a method for displaying the weighing result of a scale, in particular a shop scale, which comprises an identification, on a mobile display device. In said method, the mobile display device establishes a secure wireless communication link to the scale and displays the identification of the scale once the link has been successfully established.

20 Claims, 2 Drawing Sheets

(56) References Cited

U.S. PATENT DOCUMENTS

| | | | | |
|---|---|---|---|---|
| 9,250,116 | B2* | 2/2016 | Crooks | G01G 23/42 |
| 9,891,094 | B2* | 2/2018 | Cartwright | G01G 19/4144 |
| 9,901,289 | B1* | 2/2018 | Emalfarb | G01G 19/44 |
| 2003/0233633 | A1* | 12/2003 | Steinrisser | G01G 11/086 |
| | | | | 717/109 |
| 2004/0129461 | A1* | 7/2004 | Murdter | G01G 19/4144 |
| | | | | 177/25.13 |
| 2008/0154645 | A1* | 6/2008 | Takehara | A61B 5/0002 |
| | | | | 705/3 |
| 2010/0252334 | A1* | 10/2010 | Oseko | G01G 19/44 |
| | | | | 177/25.13 |
| 2010/0299074 | A1* | 11/2010 | Chang | A01K 5/00 |
| | | | | 702/19 |
| 2012/0095727 | A1* | 4/2012 | Brrang | G01G 23/015 |
| | | | | 702/173 |
| 2012/0122430 | A1* | 5/2012 | Hutchings | G01G 19/44 |
| | | | | 455/414.1 |
| 2013/0284806 | A1* | 10/2013 | Margalit | G06Q 30/06 |
| | | | | 235/382 |
| 2015/0025969 | A1* | 1/2015 | Schroll | G06Q 30/0633 |
| | | | | 705/14.53 |
| 2016/0171473 | A1* | 6/2016 | Pugh | G06Q 20/208 |
| | | | | 705/23 |
| 2018/0035918 | A1* | 2/2018 | Emalfarb | G01G 19/44 |
| 2018/0125393 | A1* | 5/2018 | Emalfarb | G01G 19/44 |

FOREIGN PATENT DOCUMENTS

| | | |
|---|---|---|
| DE | 102009004408 A1 | 7/2010 |
| DE | 102009007733 A1 | 8/2010 |
| DE | 202012102486 U1 | 10/2012 |
| EP | 2660572 A2 | 11/2013 |

* cited by examiner

METHOD FOR DISPLAYING THE WEIGHING RESULT OF A SCALE

This application is a U.S. National Phase under 35 USC 371 of PCT Application No. PCT/EP2014/074770 filed Nov. 17, 2014, which claims priority to the German Application No. 10 2014 100 754.9, filed Jan. 23, 2014, the disclosures of which are incorporated by reference herein.

FIELD OF THE INVENTION

The present invention relates to a method for displaying a weighing result of a scale, in particular of a store scale.

BACKGROUND OF THE INVENTION

Scales, in particular store scales, are used in retail stores, for example supermarkets, to weigh foods such as cheese, meat, sausage or the like which are displayed at a food counter. Scales can furthermore also be installed in a self-service area, for example for fruit or vegetables, or at fresh-food sales points. In this respect, a compact construction of the scales is frequently not possible due to the display apparatus required for displaying the weighing result.

It is the underlying object of the invention to provide a possibility of giving scales a design which is as compact as possible.

SUMMARY OF THE INVENTION

This object is satisfied by a method for displaying a weighing result of a scale on a mobile display device, the scale having an identifier, in which method the mobile display device establishes a secure, in particular encrypted, wireless communication connection with the scale and displays the identifier of the scale after successfully establishing the connection. The identifier is in particular a unique identifier and/or the scale is a scale subject to statutory calibration.

The scale accordingly does not have to have its own display apparatus, but this is rather taken along by the user, in particular a customer, himself or is lent to him on site, in the form of a mobile display device, for example a cell phone, in particular a smartphone, or a tablet. The scale can, however, generally also still have its own display apparatus. The scale is in particular a load receiver or a load plate.

To display a weighing result of the scale on the mobile display device, the mobile display device first establishes a secure communication connection with the scale. A secure connection is to be understood as at least an encrypted connection. A common connection key can in particular be generated which is used for a mutual authentication and/or an encryption of the data exchanged between the two devices is used. This is also called "pairing" with a Bluetooth connection, in particular when using a PIN. With a network connection, the establishing of a secured connection takes place e.g. by means of the known SSL handshake protocol, wherein a certificate is used for authenticating the scale and a symmetrical session key is subsequently generated. The establishing of the connection can be initiated both by the mobile display device and by the scale.

It is subsequently of advantage if it is also visible to the user that the mobile display device is connected. If a plurality of scales are present, as may be the case in a self-service area of a supermarket, for example, it is furthermore of advantage if the user can also see which of the plurality of scales the mobile display unit is connected to. It is therefore proposed to display the identifier of the connected scale on the mobile display device. The display can in particular be a display on a touchscreen or screen of the mobile display device, e.g. in the form of a number, of a symbol or of a flashing light, which is associated with the displayed scale.

A check is preferably made, preferably automatically, in particular by the scale and in particular after the display of the identifier of the connected scale on the mobile display device, whether the mobile display device corresponds to a device model approved for a display of the weighing results satisfying predefined demands. This is of advantage in particular with scales which are subject to statutory calibration law with respect to the displaying of the data subject to statutory calibration such as weight and price, in particular with respect to the size, in particular minimum size, of the display of the data subject to statutory calibration. To check whether the mobile display device is a device model which is approved, in particular approved by the manufacturer of the scale, access can be provided to a memory or to a database or the like in which the approved device models are stored.

If the mobile display device corresponds to an approved device model, it is in particular made possible that a weighing result of the connected scale is displayed on the mobile display device, in particular legally metrologically displayed, in particular using display parameters associated with the device model. The technical measures to display a weighing result satisfying predefined demands on the mobile display device or to prevent such a display form part of the skills of the skilled person working in the present technical field.

If the mobile display device does not correspond to an approved device model, it is preferred if the hardware parameters of the mobile display device, in particular the resolution and the dot density, are read, in particular by the mobile display device and if a check is made using the hardware parameters, in particular by the scale, whether a display of the weighing result satisfying the predefined demands is possible on the mobile display device.

It is preferred in this respect if a zoom factor is determined on the basis of the hardware parameters with which a display of the weighing results is possible which satisfies the predefined demands. The zoom factor will typically have a value greater than 1, but can generally also have a value less than 1.

It is also possible—if the mobile display device does not correspond to an approved device model—that a reference image is displayed on the mobile display device and a zoom factor is determined on the basis of a comparison of the reference image with a real measure, with which zoom factor a display of the weighing results is possible which satisfies the predefined demands. A scale bar or the like can, for example, be presented on the mobile display device which is compared with a real length scale by the user to determine the zoom factor which is required to present a weighing result, i.e. in particular a weight and a price, in a size required according to calibration law on the mobile display device.

If a display satisfying the predefined demands is possible, it is in particular made possible that a weighing result of the connected scale is displayed, in particular legally metrologically displayed, on the mobile display device, in particular using display parameters determined with reference to hardware parameters and/or with reference to a zoom factor.

The wireless communication connection is preferably a wireless network connection which is in particular standardized, in particular a WLAN connection, using a secure network protocol, in particular HTTPS, which is in particular standardized. A Bluetooth connection can, however, generally also be used, with it then typically being necessary, however, to confirm the connection interactively on the first communication start, which is very conceivable, for example, when using preconfigured mobile display devices which can be lent on site.

The mobile display device can include a web browser and the scale can include a web server. In accordance with a preferred embodiment, the identifier of the scale and/or the weighing results of the scale is/are in particular displayed on the mobile display device using a web application which is in particular mobile. In this respect, the web application can be executed in a web browser of the mobile display device, in particular using a plug-in or using HTML. No separate application software is necessary when a web application is used.

It is preferred with a plurality of scales with which the mobile display device has established a secure, wireless communication connection, if the identifiers of all scales are displayed on the mobile display device, in particular in the form of a list. The user can then choose between the individual scales. This is in particular of advantage if there are a plurality of scales in the environment of the user. A list for interaction selection can e.g. be presented.

The selection can generally take place manually, for example when the mobile display device has a touchscreen. The selection can then take place by touching the touchscreen at that position at which the identifier to be selected is displayed.

The selection can, however, also take place or be supported by technical aids, for example by detecting, in particular photographing or scanning, an identification, in particular a barcode, affixed to the scale to be selected. The selection can, however, e.g. also take place by means of near field communication (NFC). The user approaches the scale to be selected correspondingly closely with the mobile display device or touches it with the mobile display device so that an identification of the scale in form of NFC data can be transmitted to the mobile display device. An identification corresponding to or uniquely associated with the identifier of the scale to be selected can therefore be received by the mobile display device or can be transmitted to the mobile display device for the selection of a scale or of an identifier by means of a means or transmission path separate from the secure, wireless communication connection, in particular by means of image processing such as photographing and/or scanning, or by means of data transmission over a short distance such as near field communication or infrared or Bluetooth. The transmitted identification can then be compared with the displayed identifiers to select the scale to be selected.

It is preferred in this respect, if, after selecting the scale or the identifier, it is made possible only for the scale or for the scale associated with the selected identifier to display a weighing result on the mobile display device. The further scales can admittedly be connected to the mobile display device, but a display of a weighing result on the display device is not possible for these scales. The selection of the scale or of the identifier can furthermore be changeable. If the mobile display device is to be connected to a different scale, this can take place, for example, interactively or by approaching the new scale to be selected.

The weighing result can, in particular additionally, be displayed, in particular legally metrologically displayed, as a barcode on the mobile display device. The barcode can then be directly read from the mobile display device at a cash register system of a supermarket, for example. Alternatively or additionally, the weighing result can also be transmitted to a cash register system by the scale. It is, however, generally also possible that a printer is connected to the respective scale which generates a hardcopy of the respective weighing result.

A subject of the invention is furthermore a computer program with programming code means to execute the method explained above when the program is executed on a mobile display device. The computer program is in particular a web application or application software for mobile devices, in particular for mobile display devices. The application software can be downloaded onto the mobile device, for example over a WLAN connection or over a telecommunications network and/or over the internet. The application software is executed by the mobile device. The application software is approved for the display of the weighing results of the scale, preferably by the manufacturer of the scale.

Further advantageous embodiments of the invention are described in the dependent claims, in the further description and in the drawing.

A non-restrictive embodiment of the invention is illustrated in the drawing and will be described in the following.

There are shown, schematically in each case,

Figure 1:
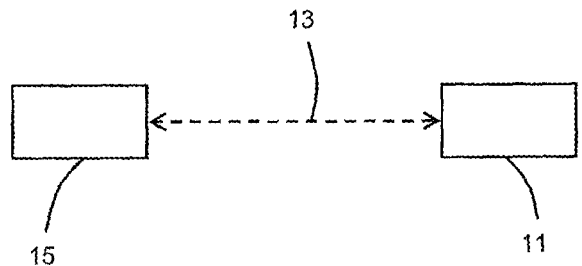
FIG. 1 a combination of a scale and a mobile display device which are wirelessly connected to one another.

A store scale 11 is shown in FIG. 1 which is installed in a self-service area of a supermarket. The scale 11 is a scale which is subject to statutory calibration or is respectively approved for legal metrological operation, i.e. a scale which is tested for its adherence to statutory calibration provisions under calibration law. The scale 11 does not have its own display apparatus to display a weighing result, whether with or without price calculation, on the scale 11. The scale 11, however, has a unique ID which is affixed to the scale 11 and with reference to which the scale 11 is uniquely identifiable. The ID of the scale 11 is electronically stored in a memory of the scale 11 and is additionally affixed visible to the user to the outside of the scale 11.

A wirelessly connected display device 15 is used for displaying a weighing result of the scale 11 and the scale 11 is connected to it via a secure, bidirectional connection 13, in particular a WLAN connection. The scale 11 includes a web server on which a web application is stored which can be executed in a web browser of the mobile display device 15 of a customer such as a tablet using a plug-in and which allows the display of a weighing result on the display device 15 in accordance with steps S1-S6 explained below in connection with FIG. 3. The plug-in is in particular a plug-in which is approved for the display of the weighing result of the scale 11 by the manufacturer of the scale 11.

Figure 3:
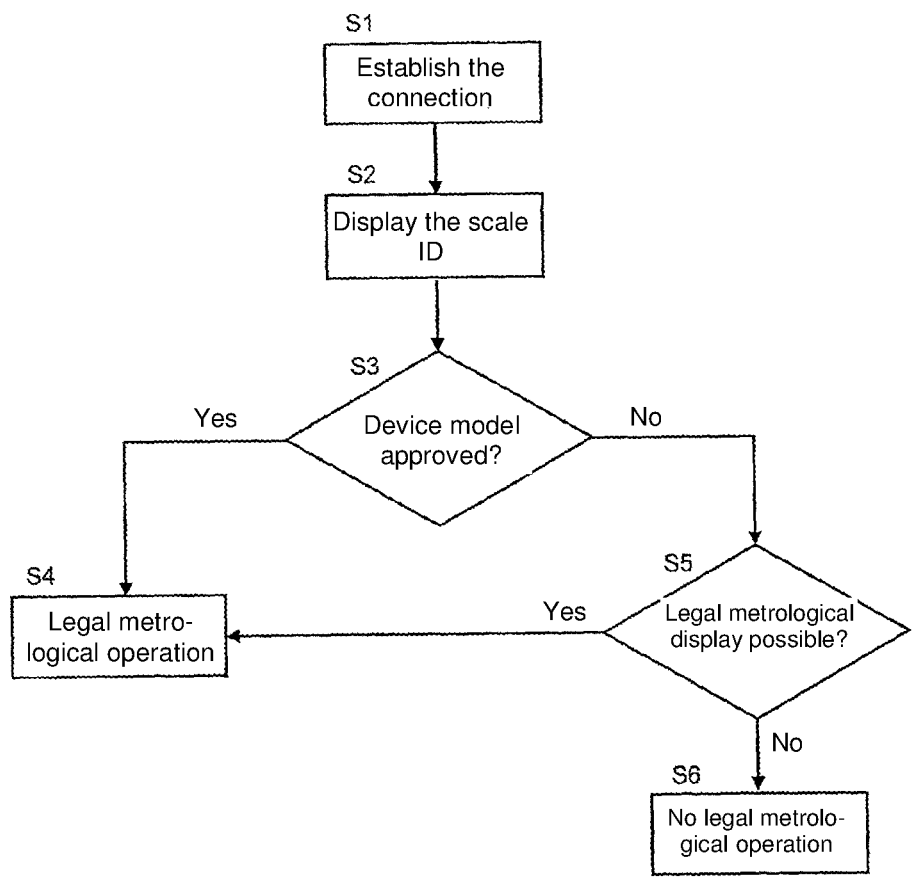
FIG. 3 a flowchart for illustrating the method in accordance with the invention.

As can be seen from FIG. 3, an encrypted communication connection 13 is first established between the mobile display device 15 and the scale 11 in accordance with step S1. After a successful establishing of the connection, the ID of the scale 11, in the present case XYZ123, is electronically transmitted via the connection 13 to the mobile device 15 and is displayed there in accordance with step S2. The customer can then determine without doubt which scale his mobile display device 15 is connected to by a comparison of the ID shown on his mobile display device 15 with the ID outwardly affixed to the scale 11.

Figure 2:
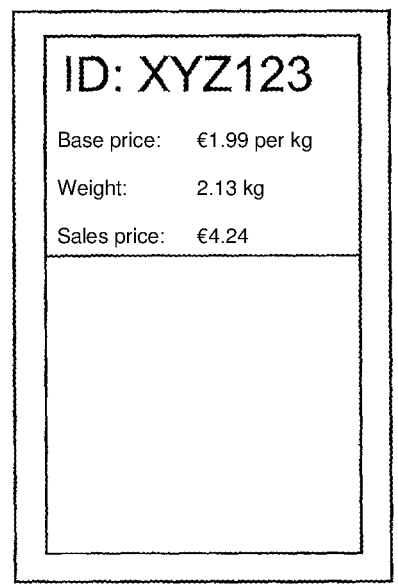
FIG. 2 a mobile display device which displays the identifier of a scale to be connected and an associated weighing result.

A check is subsequently made in accordance with step S3 whether the mobile display device 15 corresponds to a device model known to the manufacturer of the scale 11 and released or qualified by it for the display of a weighing result. With such a device model, the manufacturer of the scale 11 has already verified that a display corresponding to the statutory calibration provisions is possible on the device model. If this is the case, in accordance with step S4, the legal metrological operation between the scale 11 and the mobile display device 15 is released and a weighing result of the scale 11 can be displayed together with the ID of the connected scale 11 on the mobile device 15 (cf. FIG. 2) and can optionally additionally be transmitted to a cash register system by the scale 11. The weighing result can additionally also be displayed as a barcode on the mobile display device 15 and the barcode can then be read directly from the mobile display device 15 at a cash register system.

If, in contrast, the device model is neither known at scale 11 manufacturer's nor has been released or approved by the manufacturer for operation with the scale 11, the hardware parameters of the mobile display device 15 are read in accordance with step S5 and a check is made with reference to the hardware parameters whether a display of the weighing results satisfying the statutory calibration regulations is possible on the mobile display device 15. If this is the case, the legal metrological calibration operation is made possible as is shown in step S4. If, in contrast, this is not the case, a legal metrological operation of the mobile display device 15 with the scale 11 is suppressed in accordance with step S6. Weighing results recorded by the scale 11 can then not be displayed on the mobile display device 15.

If a plurality of scales are installed in a self-service area, the identifiers of all scales located in communication range for a secure, wireless communication connection can be displayed on the mobile display device 15. The customer then selects which one of the scales should carry out a legal metrological operation. Whether a legal metrological operation can actually take place between the selected scale and the mobile display device is determined using the above-explained decisions S3 and S5. The selection of the scale can take place, for example, in that a barcode is affixed to all of the scales, said barcodes corresponding to the respective ID of the respective scale or including it and the scale to be selected being selected by scanning the barcode and automatically comparing the scanned identification of the scale with the IDs obtained through the secure, wireless communication connection. The choice made can generally also be changed in accordance with the explained method.

It is in particular made possible by the present invention to show the weighing result of a store scale in accordance with legal metrological provisions on the mobile devices taken along by the customers themselves.

REFERENCE NUMERAL LIST 11 scale
13 communication connection
15 mobile display device
S1-S6 step

The invention claimed is:

1. A method for displaying a weighing result of a scale on a mobile display device, the scale having a unique identifier, in which method the mobile display device establishes a secure, wireless communication connection with the scale and displays the unique identifier of the scale after successfully establishing the connection.

2. The method in accordance with claim 1, wherein the scale is a store scale.

3. The method in accordance with claim 1,
further comprising the step of:
making a check of whether the mobile display device corresponds to a device model approved for a display of the weighing results satisfying predefined demands.

4. The method in accordance with claim 3,
wherein,
if the mobile display device corresponds to an approved device model, it is made possible that a weighing result of the connected scale is displayed on the mobile display device.

5. The method in accordance with claim 3,
wherein,
if the mobile display device does not correspond to an approved device model, a check is made with reference to hardware parameters of the mobile display device read out from the mobile display device as to whether a display of the weighing results satisfying the predefined demands is possible on the mobile display device.

6. The method in accordance with claim 5,
further comprising the step of:
determining a zoom factor on the basis of-the hardware parameters, with which zoom factor a display of the weighing results is possible which satisfies the predefined demands.

7. The method in accordance with claim 3,
wherein,
if the mobile display device does not correspond to an approved device model, a reference image is displayed on the mobile display device and a zoom factor is determined on the basis of a comparison of the reference image with a real measure, with which zoom factor a display of the weighing results is possible which satisfies the predefined demands.

8. The method in accordance with claim 5,
wherein,
if a display satisfying the predefined demands is possible, it is made possible that a weighing result of the connected scale is displayed on the mobile display device.

9. The method in accordance with claim 8,
wherein
display parameters determined with reference to hardware parameters and/or with reference to a zoom factor are used.

10. The method in accordance with claim 1,
wherein
the wireless communication connection is one of a wireless network connection and a WLAN connection using one of a secure network protocol and HTTPS.

11. The method in accordance with claim 1,
further comprising the step of:
displaying at least one of the unique identifier of the scale and the weighing result of the scale via a web application on the mobile display device.

12. The method in accordance with claim 11,
wherein
the web application in one of a web browser of the mobile display device and a web browser of the mobile display device using a plug-in.

13. The method in accordance with claim 1,
wherein,
with a plurality of scales with which the mobile display device has set up a secure, wireless communication connection, the unique identifiers of all scales are displayed on the mobile display device.

14. The method in accordance with claim 13,
wherein
an identification corresponding to or uniquely associated with the unique identifier of the scale to be selected is received by the mobile display device for a selection of a scale by means of a means separate from the secure, wireless communication connection.

15. The method in accordance with claim 14,
wherein
the identification corresponding to or uniquely associated with the unique identifier of the scale to be selected is received by the mobile display device by means of image processing or data transmission using near field communication.

16. The method in accordance with claim 14,
further comprising the step of:
comparing the transmitted identification with the displayed unique identifiers.

17. The method in accordance with claim 13,
wherein a scale is selected, and
wherein, after the selection of the scale, it is only made possible for the selected scale to display a weighing result on the mobile display device.

18. The method in accordance with claim 13,
wherein a scale is selected, and
wherein the selection of the scale is changeable.

19. The method in accordance with claim 1,
further comprising the step of:
displaying the weighing result as a barcode on the mobile display device.

20. A mobile display device comprising:
a processor; and
a memory comprising a computer program with program code-executable by the processor for implementing a method comprising:
 displaying a weighing result of a scale on a mobile display device, the scale having a unique identifier, wherein the mobile display device establishes a secure, wireless communication connection with the scale; and
 displaying the unique identifier of the scale after successfully establishing the connection.

* * * * *